Feb. 12, 1924. Re. 15,760

J. A. KAMMERDINER

ROTARY JAR

Original Filed Oct. 30, 1922 2 Sheets-Sheet 1

INVENTOR.

James A. Kammerdiner

BY Westall and Wallace

ATTORNEYS

Feb. 12, 1924.

J. A. KAMMERDINER

Re. 15,760

ROTARY JAR

Original Filed Oct. 30, 1922 2 Sheets-Sheet 2

INVENTOR.
James A. Kammerdiner
BY Nestall and Wallace
ATTORNEYS

Reissued Feb. 12, 1924. Re. 15,760

UNITED STATES PATENT OFFICE.

JAMES ALLEN KAMMERDINER, OF LOS ANGELES, CALIFORNIA.

ROTARY JAR.

Original No. 1,469,305, dated October 2, 1923, Serial No. 597,726, filed October 30, 1922. Application for reissue filed December 17, 1923. Serial No. 681,306.

*To all whom it may concern:*

Be it known that I, JAMES ALLEN KAMMERDINER, a citizen of the United States, and resident of Los Angeles, in the county of Los Angeles and State of California, have invented new and useful Improvements in a Rotary Jar, of which the following is a specification.

This invention relates to a jar adapted for use in the hydraulic rotary drilling of wells, as commonly practiced in drilling wells for oil. The jars are used to assist in loosening tools which become stuck in the hole, and are especially useful when fishing for lost tools. In hydraulic rotary drilling, it is essential that a circulation of water or water and mud be maintained in the hole. This circulation is to prevent the settling of drillings in the bottom of the hole, as such settlings may freeze the drill pipe or tools fast in the hole. Circulation must be kept up, even though drilling ceases. In spite of these precautions the pipe and tools will at times become stuck in the hole. At such times, it is advantageous to have jars which may be employed to jar the pipe or tool loose. Such jars must be constructed so that they will not interfere with circulation.

The primary objects of this invention are first, to provide a jar which may be tripped by a rotary movement; second, to provide a jar which is adapted to be placed in a string of drill pipe, and will not interfere with circulation at any time and will permit rotation of the string. In addition to the broader objects of this invention, there are certain details of structure, whereby a strong, simple, economical, and easily manipulated jar is obtained.

Figure 1:
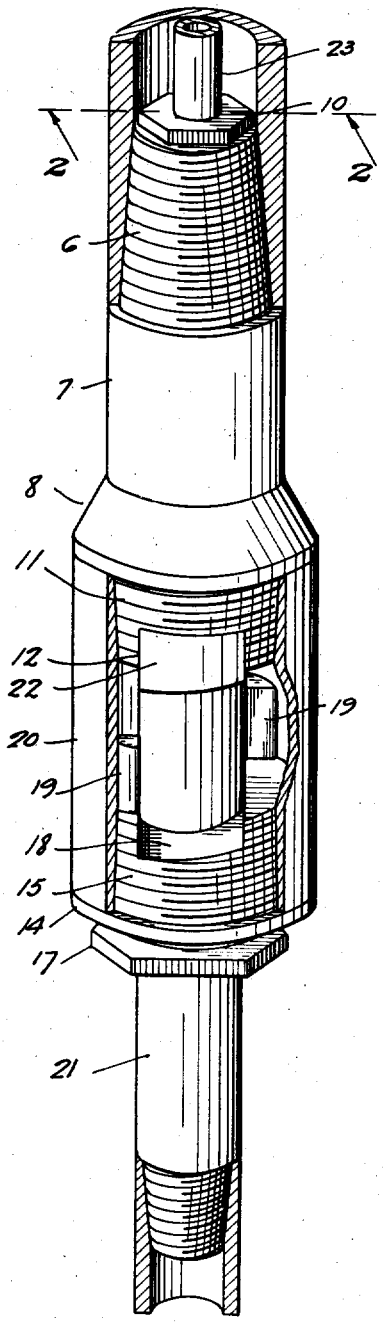
Figure 2:
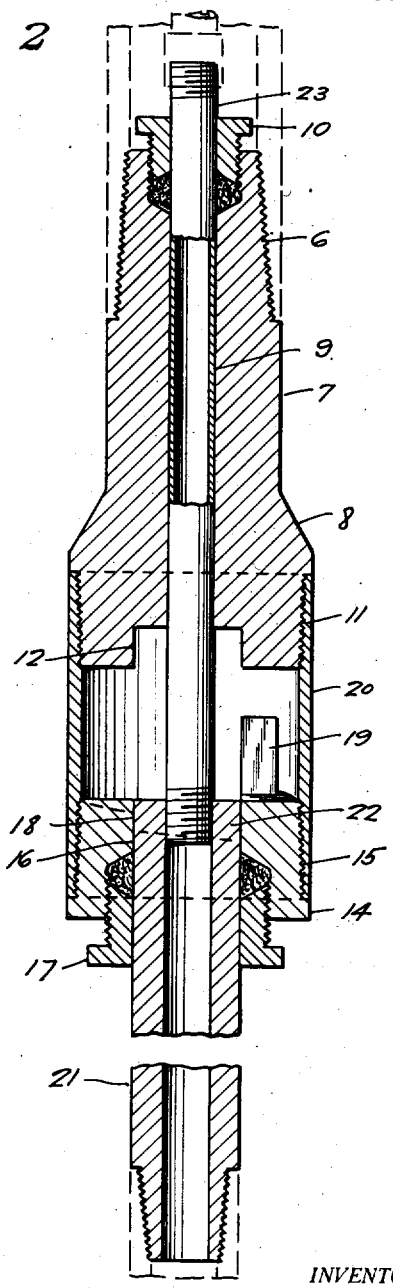
Figure 3:
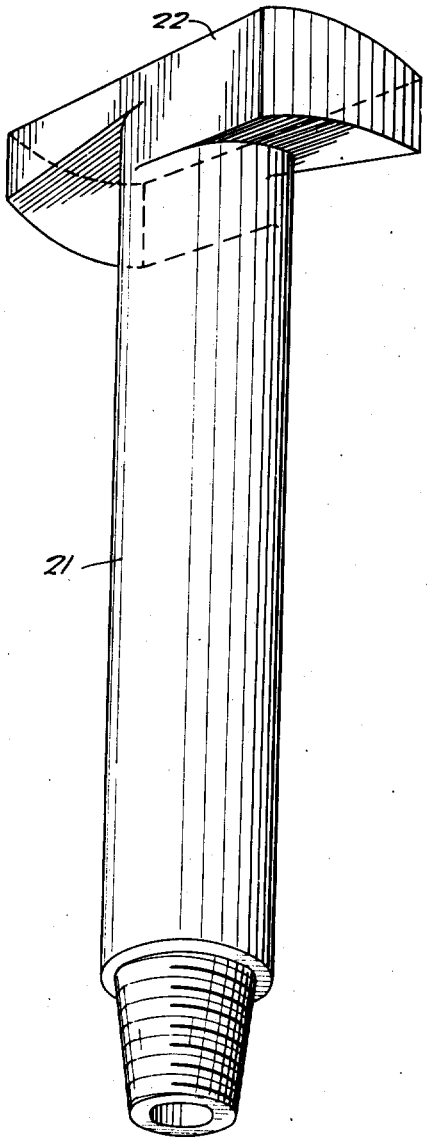
Figure 4:
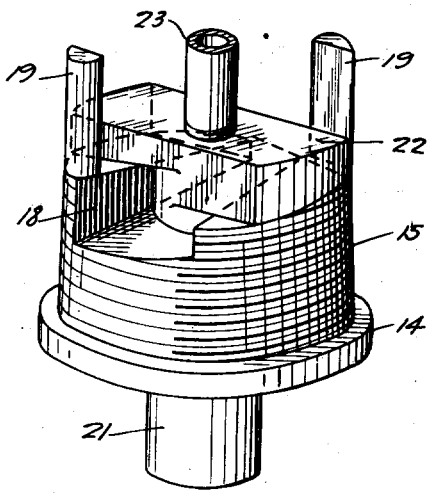
Figure 5:
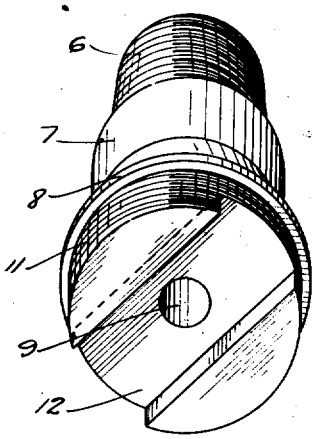

These objects together with other objects and corresponding accomplishments are obtained by means of the embodiment of my invention illustrated in the accompanying drawing, in which:

Fig. 1 is a perspective view of the complete jar with sections thereof broken away to better show the structure; Fig. 2 is an axial section through the jar; Fig. 3 is a perspective view of the T; Figs. 4 and 5 are perspective views of the subs.

Referring more particularly to the drawings, the upper sub has a male tool joint portion 6 on a body 7 and a head 8. Extending through the sub is a bore 9 to slidably receive a conduit. The upper end of the bore is enlarged and threaded to receive a packing gland 10. The lower portion of the head is reduced in diameter and threaded as indicated by 11. Extending transversely across the lower portion of the head is a pocket 12 to receive the head of the T so as to form a clutch therewith for the purpose of rotating the string of pipe. This sub is a rotary sub.

The lower sub 14 is of the same external diameter as the head of the rotary sub, is reduced in diameter and threaded as indicated by 15. The lower sub has a bore 16 to slidably receive the leg of the T. The bore is enlarged and threaded to receive a packing gland 17. The upper portion of the lower sub is provided with a pocket 18 to receive the head of the T, and the upper faces of the sub are inclined downwardly in the same direction toward the bottom of the pocket. This sub is an impact sub. The stock of the impact sub is extended to form posts 19 to limit turning of the T.

Connecting the subs is a bowl 20. This bowl provides a chamber in which the T may be moved. The T comprises a tubular leg 21 having a tool joint at its lower end and a head 22 such that it may be disposed in either pocket 12 or pocket 18. The upper face of the T head is flat so that it may be disposed to snugly rest in the pocket 12, and the lower faces are inclined to conform to the inclination of the faces on the impact sub.

Extending from the head and threadedly secured thereto is a tubular crown member 23 which slidably passes through the upper sub. It is obvious that the T is so arranged that it may be moved from the pocket 18 in the impact sub to the pocket 12 in the rotary sub. In either position there is a complete closed passage way extending from the tool joint in the upper plug to the tool joint in the lower sub. The packing glands in the subs permit the chamber in the bowl to be filled with grease to allow easy operation and to prevent leakage of the grease from the bowl or entrance of mud and sand into the bowl.

When it is desired to rotate the string of pipe, the string is lowered until the head 22 of the T reposes in the pocket 12 on the rotary sub. If the head of the T does not register with the pocket, the string may be given a slight turn until the head finds its position and drops into the pocket. The posts 19 end short of the rotary sub so that there is sufficient clearance for the turning of the head when resting against the lower face of the rotary sub. Suppose it is desired to raise a tool by means of the string of pipe, the string is raised and the T head will drop into the pocket 18. If the tool is stuck and the strain is not sufficient to loosen it, the string is lowered a slight amount so that the T head 22 clears the upper face of the impact sub and the bowl is then turned so that the T rests upon the face of the impact sub across the pocket. A strain is then placed upon the string by pulling it upward. The bowl is then turned until the T head registers with the pocket 18, whereupon the T will snap into the pocket thereby jarring the string and loosening the tool. Thus, a rotary trip is provided, there being two sections slackly linked together. The inclined faces of the T on the impact sub assist the head in sliding into position in the pocket. The posts 19 on the lower sub prevent the T from turning too far when resting on the faces of the impact sub.

What I claim is:

1. A rotary jar comprising two sections slackly linked together and rotatable with respect to one another, shoulders on said sections arranged so that they may engage one another and hold said sections in a contracted position, said shoulders being arranged so that by rotating said sections they may disengage thereby tripping and permitting the sections to be arrested by impact of the linked parts.

2. A rotary jar comprising two sections slackly linked together so as to be contracted and expanded and to have relative rotary movement, trip means to arrest the movement of said sections intermediate in a contracted position and to take a tensile strain, said trip means being arranged to be released by relative rotation of said sections and to freely permit movement of said sections to their expanded position where they are arrested by impact.

3. A rotary jar adapted to be connected in a string of pipe comprising a section having a support with a pocket at one end, two sections slackly linked thereto and having a T member arranged to rest upon said support at the sides of said pocket or to fit within said pocket, whereby turning of said sections relative to one another will trip said T into said pocket.

4. A rotary jar adapted to be connected in a string of pipe comprising a bowl section having a chamber provided with a pocket at one end, a tubular T slidably extending into said chamber and having a head arranged to fit within said pocket and means to connect the bore of said T with said bowl so as to provide a closed expansible passage through said jar, the head of said T being arranged to be disposed out of said pocket and to rest upon the end across said pocket or to be disposed in said pocket at will.

5. A rotary jar adapted to be connected in a string of pipe comprising a bowl section having a chamber, said bowl section having a bottom wall provided with a transverse pocket, a tubular T slidably extending into said chamber having a head arranged to fit within said pocket, and means to connect the bore of said T with said bowl so as to provide a closed expansible passage through said jar, the head of said T being arranged to be disposed out of said pocket or in said pocket at will.

6. A rotary jar adapted to be connected in a string of pipe comprising a bowl section having a chamber provided with a pocket in its upper wall and a corresponding pocket in its lower wall, a tubular T slidably extending into said chamber having a head arranged to fit within said pocket, and means to connect the bore of said T to said bowl so as to provide a closed expansible passage through said jar, the head of said T being arranged to be disposed out of said pocket or in said pocket at will.

7. A rotary jar adapted to be connected in a string of pipe comprising a rotary sub having a transverse pocket, an impact sub having a transverse pocket, a cylindrical bowl connecting said subs and forming a chamber, a tubular T slidably extending into said chamber through the impact sub having a head arranged to fit within either of said pockets, and means to connect the bore of said T with said bowl so as to provide a closed expansible passage through said jar.

8. A rotary jar adapted to be connected in a string of pipe comprising a rotary sub having a transverse pocket, an impact sub having a transverse pocket, a cylindrical bowl connecting said subs and forming a chamber, a tubular T slidably extending into said chamber and having a head arranged to fit within either of said pockets, a tubular extension mounted on said T and slidably extending through said rotary head so as to provide a closed expansible passage through said jar.

9. A rotary jar adapted to be connected in a string of pipe comprising an impact sub having a transverse pocket, the faces of said impact head being inclined at the pocket, a rotary sub having a transverse pocket, a cylindrical bowl connecting said subs and forming a chamber, a tubular T slidably extending into said chamber and having a head arranged to fit within either of said pockets, and means to connect the bore of said T through the rotary head so as to provide a closed expansible passage through said jar.

10. A rotary jar adapted to be connected in a string of pipe comprising an impact sub having a transverse pocket, the faces of said impact head being inclined at the pocket, a rotary sub having a transverse pocket, a cylindrical bowl connecting said subs and forming a chamber, a tubular T slidably extending into said chamber and having a head arranged to fit within either of said pockets, a tubular extension mounted on said T and slidably extending through said rotary head so as to provide a closed expansible passage through said jar.

In witness that I claim the foregoing I have hereunto subscribed my name this 4th day of December, 1923.

JAMES ALLEN KAMMERDINER.